May 30, 1944.   H. L. JAVAL   2,349,967
EXPLOSION AND INTERNAL COMBUSTION ENGINE
Filed Oct. 7, 1941

Inventor:
HENRI L. JAVAL
By A. M. Holcombe
Attorney.

Patented May 30, 1944

2,349,967

UNITED STATES PATENT OFFICE 2,349,967

EXPLOSION AND INTERNAL-COMBUSTION ENGINE

Henri Leopold Javal, Vichy, France; vested in the Alien Property Custodian

Application October 7, 1941, Serial No. 414,028
In France April 17, 1940

4 Claims. (Cl. 123—68)

The thermal efficiency of explosion or internal combustion engines only attains a small part of the corresponding thermal energy, and the object of the present invention is to eliminate various causes of this waste of energy.

The compression absorbs indeed, as nonmotive work, a fraction of power which seems capable of a certain recuperation.

On the other hand, the thermal energy and the gas pressure attain a maximum upon explosion, when the piston is in the dead centre, i. e. at a nonmotive instant, the piston being locked by the position of the connecting rod in extension with the crank. The power given by the explosion therefore only yields useful work after the crankshaft has rotated by an arc sufficient for unlocking the piston and for causing the connecting rod to form with the crank an angle of sufficient height for exerting a useful pressure. This, however, results in a corresponding downward movement of the piston and thus the gas pressure has already decreased, so that the explosion power only has a useful effect when this power has been weakened.

Furthermore, the connecting rods are subjected, during the motor stroke, to harmful oscillation, and at no moment at all the connecting rods will work simultaneously with respect to the piston plane and with respect to the crankshaft under the most suitable angles for transmitting the maximum power with the minimum resistance.

A known means for improving the driving moment of the connecting rod consists in offsetting the cylinder axes with respect to the crankshaft in the direction of rotation. This however reduces the compression of the engine, and, at the upper dead centre this compression, reacting upon the foot of the connecting rod, will subject the crank pin to a harmful moment which, if the amount of offset is somewhat large, would have a tendency to stop the crankshaft.

The various drawbacks indicated above: braking effect due to the compression, inertia at the dead centre, insufficiency of driving torque, are corrected by means of the combination described below, where the suction and compression work are or may be effected by members distinct from the engine cylinder into which the compression will deliver at the beginning of the motor stroke of the engine piston, the combustion mixture or the air alone, already compressed or undergoing compression.

If this compression is ended during a fraction of the downward stroke of the engine piston or if the chosen ratio of compression be attained right at the beginning of filling, it will invariably itself set up upon the piston a driving work.

The explosion, then taking place, and due to the fact that the stroke of the piston is now free, the detent of the gas will also take place freely.

The explosion point is determined by the adjustment of the compressor, of its output in terms of the volume of gas used and of the compression ratio chosen. The cylinder shift is adjusted in terms of the explosion point, in a manner that the connecting rod be near to the perpendicular to the piston surface while forming an active angle with the crank.

By way of example and especially for well illustrating the invention, the latter will be explained according to a theoretical embodiment corresponding to the diagrammatic Figures 1 and 2 of the joined drawing.

Figure 1:
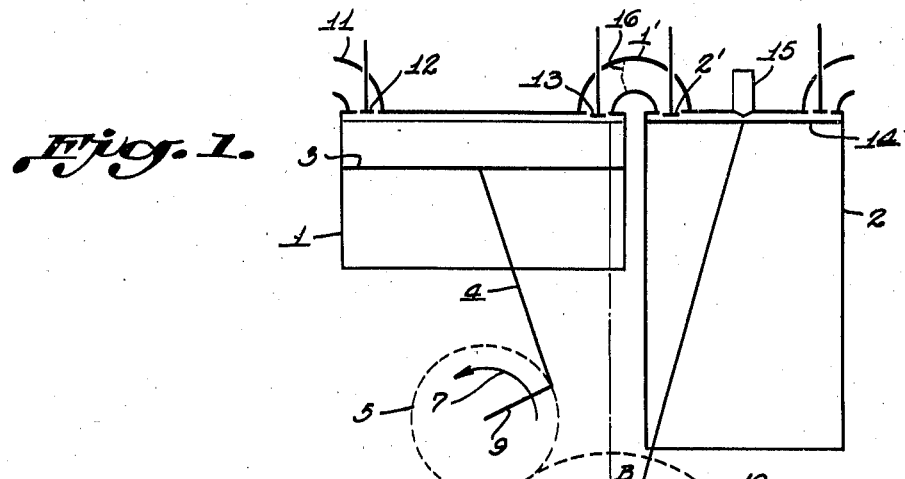
Figure 1 is an end view of the compressor and engine cylinders, with the compressor piston below upper dead centre.

This embodiment comprises an auxiliary cylinder 1 for suction and compression, with normally arranged axis, feeding two motor cylinders such as 2. For the sake of simplicity, only one cylinder has been shown on the drawing. The cylinders 1 and 2 communicate, at the upper part, by a pipe 1' closed by any well known means. On the drawing is shown a valve 13 in cylinder 1 and a valve 2' in cylinder 2. Piston 3 of cylinder 1 is actuated by a connecting rod 4 by means of a crankshaft 5 driven by the engine crankshaft 6, but at a speed double of the latter. These two crankshafts rotate respectively in the directions indicated by the arrows 7 and 8. The length of crank 9 of the compressor is half that of the engine crank 10.

The angular shift of crank 9 with respect to crank 10 is adjusted in terms of the compression ratio as lagging by two units per unit of compression: for instance for a compression ratio of 6 a lag of 2/6 or 1/3 of stroke, i. e. that when the engine piston 14 is at the upper dead centre, the compressor piston 3 will be at 2/3 of its stroke.

The capacity or volume of cylinder of compressor 1 is the same as that of each of the engine cylinders, such as 2, but since the stroke of piston 3 is only one-half, the bore of cylinder 1 is equal to that of cylinder 2 multiplied by $\sqrt{2}$.

The motor cylinders such as 2 are shifted with respect to the crankshaft axis by about 9/10 of the radius of crankshaft 6.

The two cylinders 2 of the same group, supplied by one and the same compressor, operate at an interval of one stroke.

On Figure 1 the pistons are shown in the position they occupy at the moment when piston 3 arrives at two-thirds of its stroke towards its upper dead centre, piston 14 of cylinder 2 being then at its upper dead centre owing to the adjustment indicated above. The gaseous charge (combustive mixture or air alone, according to the type of engine) has been drawn in through pipe 11 during the downward stroke of piston 3 and the valve 12 will now open. This charge has been compressed during the upward stroke up to the moment when piston 3 is in the position shown, the valve 12 being then closed. If the gaseous charge has been taken at atmospheric pressure, it will now be at a pressure of 3 kg./sq. cm. Valves 13 and 2' are then opened, compressor 1 communicates with cylinder 2, piston 14 being, as already seen, at its upper dead centre.

Figure 2:
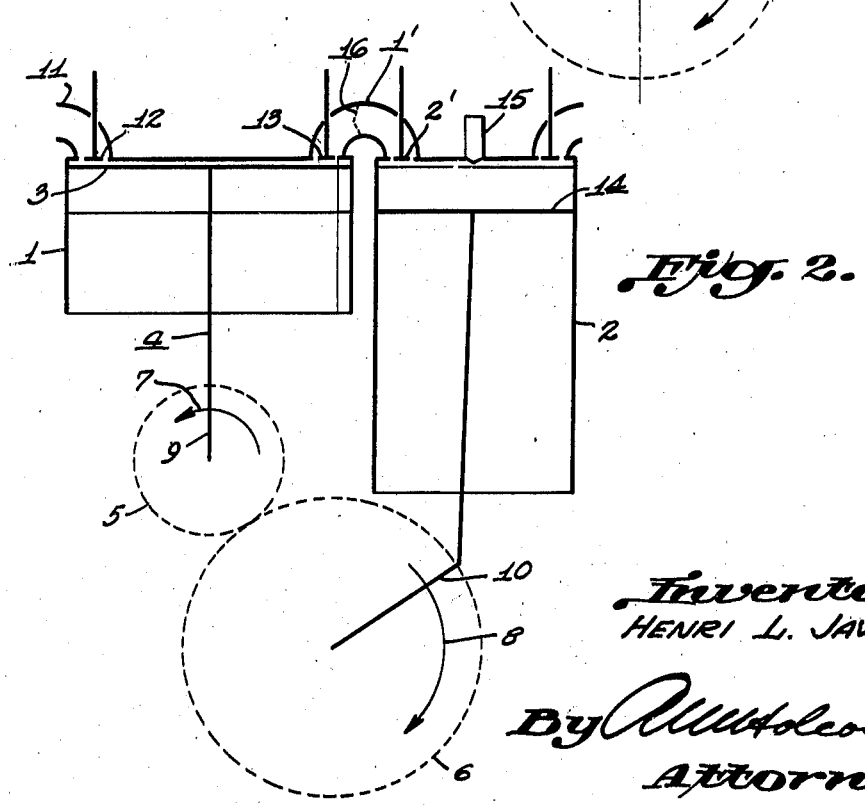
Fig. 2 is the same as Figure 1, except that the compressor piston is at upper dead centre and the engine piston on its downward stroke.

The gaseous charge is then discharged into cylinder 2 while the pistons are moving, and this up to the moment when the pistons are in the position of Figure 2, where piston 3 is at its upper dead centre and piston 14 at 1/6 of its downward stroke. The gaseous charge will then have passed entirely into cylinder 2, and in passing from 1/3 of the cylinder volume to 1/6, the pressure will have passed from 3 to 6 kg./sq. cm. At this moment, the valves close and ignition is effected by any suitable device 15. A grid or wire gauze muff, or any other known device 16 prevents the combustion or explosion to spread beyond the cylinder.

It will be seen that in this manner the compression is effected not in a closed vessel but on the surface of a piston at the beginning of the downward stroke. It assists the downward motion of the piston and produces motive power. Since the explosion is set up, in the considered case, at 1/6 of the stroke and the engine axis is shifted by the suitable fraction, the connecting rod will transmit the movement of the piston in a substantially straight line and the crank will have passed the dead centre by a sufficiently large arc and will be sufficiently inclined to the connecting rod for not opposing any resistance to its pressure. On the other hand, since the explosion takes places under the maximum of compression, but yet during the downward stroke of the piston, and on a piston the stroke of which is free, the loss of power due to the resistance of the dead centre has thus been eliminated.

It follows that the detent of the gases will take place freely and that the piston will be projected with the full force of the explosion. The energy of the gases will thus be transformed into work at a maximum.

The method of compression of the gases may be of any suitable type. For instance, the suction and compression cylinder and its crankshaft may be replaced by any other device and particularly by a turbo-compressor using, according to the known means, the force of the escape gases, the compressor capacity and speed being adjusted in order to give in each engine cylinder the chosen compression ratio during the corresponding fraction of motor stroke.

It should be observed that the combination described will further permit to change the characteristics of an engine, such as the bore and stroke, and even to increase both together, without changing the consumption, since the volume of admitted gases is not, as in the usual cycles, rigidly determined by the cylinder capacity, but only by the adjustment of the compressor and the chosen ignition point.

In the case of an internal combustion engine, air alone is being discharged into the engine cylinder, and the fuel is injected at the required moment for its ignition.

The invention is not limited to one type of engine, to one form of compression or one determined cycle, but applies to all engines, whatever their type, of which it is desired to increase the efficiency by setting up the explosion under the required compression, during the motor stroke and after a fraction of the stroke sufficient for unlocking the piston. The thus modified cycle may be used in an engine with normal axial arrangement as well as in a motor with axial shift, whatever the means employed for effecting the compression, the cycle used, the nature of the fuel and the thermal process or the supply system adopted (carburettor, injection or other).

The method described, further permits a complete evacuation of the burnt gases, due to the absence of a compression chamber or dead space.

The ignition, at any required point of the motor stroke of the engine piston, without corresponding loss in the ratio of compression, may be obtained by a suitable mutual adjustment of compressor and engine, for instance by keying suitably the first with respect to the second.

I claim:

1. In an internal combustion engine, a crankshaft, a work cylinder offset axially with respect to the axis of said crankshaft in the direction of rotation of said shaft, a piston in said cylinder, a connecting rod pivotally secured to said piston and to the crank of said shaft, a second crank-shaft, a compression cylinder axially aligned with the second crank-shaft, a compression piston in said compression cylinder and connected to said second crank-shaft, valve controlled means operatively connecting said cylinders to transfer a compressed charge from the compression cylinder to the work cylinder, the cranks of said crank-shafts being angularly offset so that the compression piston lags behind the working piston, and means to explode the transferred charge in the work cylinder when the work piston has passed its dead center and when its connecting rod approaches an axial position in the work cylinder and at a substantial angle to the crank on the crank-shaft.

2. In an internal combustion engine, a crankshaft, a work cylinder offset axially with respect to the axis of said crank-shaft in the direction of rotation of said shaft, a piston in said cylinder, a connecting rod pivotally secured to said piston and to the crank of said shaft, a second crank-shaft, a compression cylinder axially aligned with the second crank-shaft, a compression piston in said compression cylinder and connected to said second crank-shaft, valve controlled means operatively connecting said cylinders to transfer a compressed charge from the compression cylinder to the work cylinder, the cranks of said crank-shafts being angularly offset so that the compression piston lags behind the working piston, and means to explode the transferred charge in the work cylinder when the work piston has passed its dead center and when its connecting rod approaches an axial position in the work cylinder and at a substantial angle to the crank on the crankshaft, said second named crank-shaft being rotated at twice the speed of said first named crank-shaft and in the opposite direction.

3. In an internal combustion engine, a crankshaft, a work cylinder offset axially with respect to the axis of said crank-shaft in the direction of rotation of said shaft, a piston in said cylinder, a connecting rod pivotally secured to said piston and to the crank of said shaft, a second crank-shaft, a compression cylinder axially aligned with the second crank-shaft, a compression piston in said compression cylinder connected to said second crank-shaft, valve controlled means operatively connecting said cylinders to transfer a compressed charge from the compression cylinder to the work cylinder, the cranks of said crank-shafts being angularly offset so that the compression piston lags behind the working piston, means to explode the transferred charge in the work cylinder when the work piston has passed its dead center and when its connecting rod approaches an axial position in the work cylinder and at a substantial angle to the crank on the crank-shaft, said second named crank-shaft being rotated at twice the speed of said first named crank-shaft and in the opposite direction, said connecting rod being disposed axially of the cylinder and angularly with respect to its crank.

4. In an internal combustion engine, a crankshaft, a work cylinder offset axially with respect to the axis of said crank-shaft in the direction of rotation of said shaft, a piston in said cylinder, a connecting rod pivotally secured to said piston and to a crank of said shaft, a second crank-shaft, a compression cylinder axially alined with said second crank-shaft, a compression piston in said compression cylinder connected to said second crank-shaft, valve controlled means operatively connecting said cylinders to transfer a compressed charge from the compression cylinder to the work cylinder, the cranks of said crank shafts being angularly offset relatively to one another in the sequence that the compression piston lags behind the working piston, means to explode the transferred charge in the work cylinder when the work piston has passed its dead center and when its connecting rod approaches an axial position in the work cylinder and at a substantial angle to the crank on its crank-shaft, gearing of a ratio connecting said crank-shafts to rotate the second crank-shaft at approximately twice the speed of said first crank-shaft and in the opposite direction of rotation.

HENRI LEOPOLD JAVAL.